United States Patent
Sugihara et al.

(10) Patent No.: US 11,909,231 B2
(45) Date of Patent: Feb. 20, 2024

(54) CHARGING PAD

(71) Applicant: PRIME PLANET ENERGY & SOLUTIONS, INC., Tokyo (JP)

(72) Inventors: Atsushi Sugihara, Toyota (JP); Shizuka Masuoka, Nagoya (JP); Kodai Nagano, Nagoya (JP)

(73) Assignee: Prime Planet Energy & Solutions, Inc., Tokyo (JP)

( * ) Notice: Subject to any disclaimer, the term of this patent is extended or adjusted under 35 U.S.C. 154(b) by 0 days.

(21) Appl. No.: 17/808,222

(22) Filed: Jun. 22, 2022

(65) Prior Publication Data

US 2022/0416592 A1 Dec. 29, 2022

(30) Foreign Application Priority Data

Jun. 24, 2021 (JP) .................. 2021-104915

(51) Int. Cl.
*H02J 50/90* (2016.01)
*H02J 50/10* (2016.01)
*H02J 50/00* (2016.01)

(52) U.S. Cl.
CPC .......... *H02J 50/90* (2016.02); *H02J 50/005* (2020.01); *H02J 50/10* (2016.02)

(58) Field of Classification Search
None
See application file for complete search history.

(56) References Cited

U.S. PATENT DOCUMENTS

| | | | |
|---|---|---|---|
| 8,373,310 B2 | 2/2013 | Baarman et al. | |
| 9,660,481 B2* | 5/2017 | Chen | H01F 27/306 |
| 10,491,727 B1 | 11/2019 | Liu | |
| 2011/0115433 A1* | 5/2011 | Lee | H02J 50/10 |
| | | | 320/108 |
| 2012/0052923 A1* | 3/2012 | Park | H01M 10/44 |
| | | | 455/567 |
| 2015/0263565 A1* | 9/2015 | Amano | H02J 50/90 |
| | | | 320/108 |
| 2015/0318709 A1* | 11/2015 | Jol | H02J 50/90 |
| | | | 307/104 |
| 2015/0325362 A1* | 11/2015 | Kumura | H01F 38/14 |
| | | | 336/84 M |
| 2015/0380969 A1* | 12/2015 | Malmberg | H02J 50/10 |
| | | | 320/108 |
| 2016/0315496 A1* | 10/2016 | Barnard | H02J 7/0044 |
| 2017/0146890 A1* | 5/2017 | Shoemake | H02J 7/00 |
| 2019/0023168 A1* | 1/2019 | Wheeler | B60R 11/00 |

(Continued)

FOREIGN PATENT DOCUMENTS

JP 2012-514967 A 6/2012
JP 2013-005543 A 1/2013

(Continued)

*Primary Examiner* — Daniel Kessie
(74) *Attorney, Agent, or Firm* — Finnegan, Henderson, Farabow, Garrett & Dunner, LLP

(57) ABSTRACT

A charging pad includes a side surface on which a charged terminal device is to be placed face to face. The side surface includes a protruding flat surface portion that is raised from a peripheral edge portion, a power transfer coil that is incorporated in a raised region of the protruding flat surface portion, and a holding mechanism that allows the charged terminal device at a predetermined position with respect to the power transfer coil.

16 Claims, 2 Drawing Sheets

(56) References Cited

U.S. PATENT DOCUMENTS

| | | | |
|---|---|---|---|
| 2019/0109482 A1* | 4/2019 | Park | H02J 50/70 |
| 2020/0212689 A1* | 7/2020 | Yamamoto | H02J 7/0045 |
| 2022/0158472 A1* | 5/2022 | Pan | H02J 7/02 |
| 2022/0352765 A1* | 11/2022 | Cook | H02J 50/10 |

FOREIGN PATENT DOCUMENTS

| | | |
|---|---|---|
| JP | 2013-118720 A | 6/2013 |
| JP | 2014-057023 A | 3/2014 |
| KR | 2015-0093526 A | 8/2015 |

* cited by examiner ical induction. The wireless charging stand disclosed in
CHARGING PAD

CROSS REFERENCE TO RELATED APPLICATIONS

The present application claims priority from Japanese Patent Application No. 2021-104915 filed on Jun. 24, 2021, which is incorporated by reference herein in its entirety.

The present invention relates to a charging pad.

BACKGROUND

JP 2014-057023 A discloses a wireless charging stand that transmits electric power to a power receiver using electromagnetic induction. The wireless charging stand disclosed in the publication includes a power transmission coil disclosed on a lower surface of a circuit board, and a ferrite plate disposed below the power transmission coil. The circuit board and the power transmission coil are accommodated inside a case, the power transmission coil is fixed to the circuit board, and the ferrite plate is fixed to a bottom surface of the inside of the case. In such a wireless charging stand, the circuit board, the power transmission coil, and the ferrite plate are accommodated inside the case, the power transmission coil is fixed to the circuit board, and the ferrite plate is fixed to the bottom surface of the inside of the case so as to be disposed below the power transmission coil. The publication states that this reduces degradation of electric power transmission efficiency that results from variations of resonance frequency of the wireless charging stand. The publication also states that it is possible to prevent leakage of magnetic flux and damages to the ferrite plate caused by an impact.

SUMMARY

In the wireless charging using electromagnetic induction, it is desirable that the position of the power transmission coil of the charging pad end and the position of the power receiving coil of the power receiving end be aligned appropriately, in order to achieve efficient charging.

A charging pad according to the present disclosure includes a side surface on which a charged terminal device is to be placed face to face. The side surface includes a protruding flat surface portion that is raised from a peripheral edge portion, a power transfer coil that is incorporated in a raised region of the protruding flat surface portion, and a holding mechanism that allows the charged terminal device al a predetermined position with respect to the power transfer coil. The just-described charging pad is able to achieve non-contact charging smoothly.

DETAILED DESCRIPTION

Embodiments of the invention according to the present disclosure will be described hereinbelow. It should be noted, however, that the disclosed embodiments are, of course, not intended to limit the invention. The present invention is not limited to the embodiments described herein unless specifically stated otherwise. The drawings are depicted schematically and do not necessarily reflect actual objects. The features and components that exhibit the same effects are designated by the same reference symbols as appropriate, and the description thereof will not be repeated.

Charging Pad 10

Figure 1:
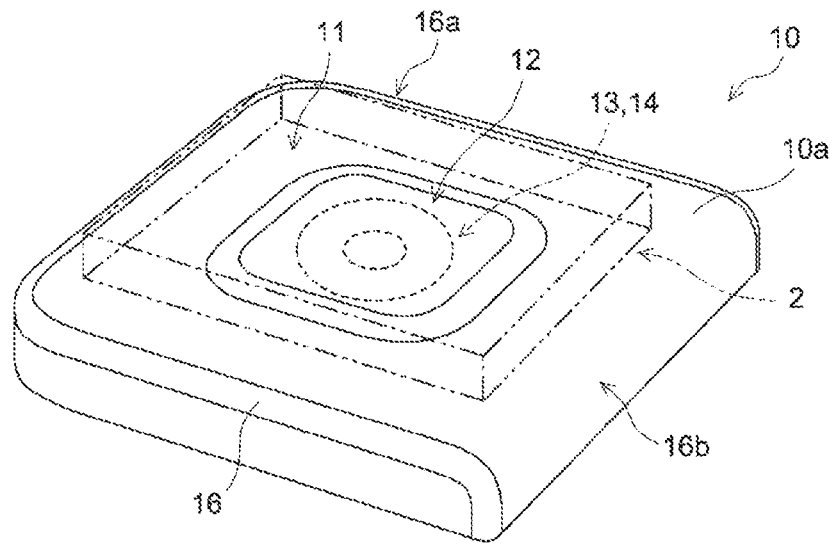
FIG. 1 is a perspective view illustrating a charging pad 10.
Figure 2:
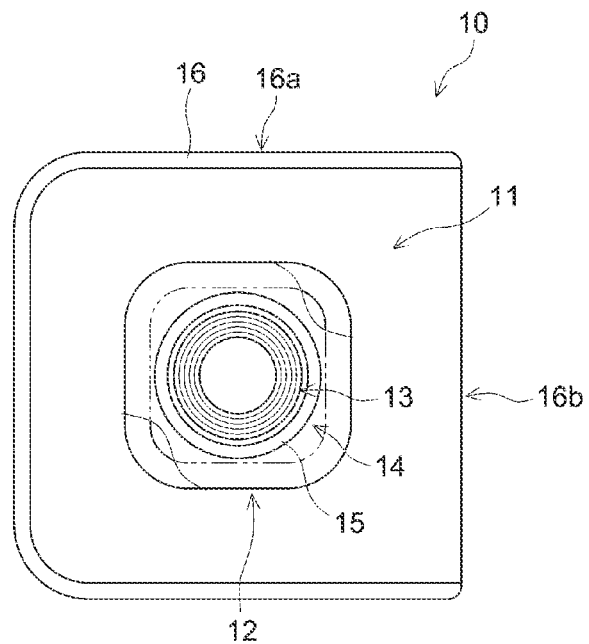
FIG. 2 is a plan view of the charging pad 10.

FIG. 1 is a perspective view illustrating a charging pad 10. The charging pad 10 is one embodiment of the present invention. In FIG. 1, a charged terminal device 2 that is to be placed on the charging pad 10 is indicated by the dash-dot-dot lines. FIG. 2 is a plan view of the charging pad 10. In FIG. 2, a housing 10a is partially cut away in a protruding flat surface portion 12 of the charging pad 10 to clearly show a power transfer coil 13 and a magnet 15, which are incorporated in the charging pad 10.

As illustrated in FIG. 1, the charging pad 10 includes a side surface 11, on which the charged terminal device 2 is to be placed face to face. In this embodiment, the charging pad 10 is configured to include a substantially rectangular housing provided with rounded corner portions. The side surface 11, on which the charged terminal device 2 is to be placed face to face, is provided to be an upper surface of the charging pad 10. The side surface 11 includes a protruding flat surface portion 12, a power transfer coil 13, a holding mechanism 14, and a light emitting unit 16.

Protruding Flat Surface Portion 12

The protruding flat surface portion 12 is a region that is raised from a peripheral edge portion. In this embodiment, the side surface 11 is in a substantially rectangular shape. The protruding flat surface portion 12 is provided in the center of the side surface 11. In the protruding flat surface portion 12, a substantially rectangular-shaped region having a size smaller than the side surface 11 protrudes upward, and the upper surface thereof is flat. Although the protruding flat surface portion 12 has a substantially rectangular shape having rounded corners in this embodiment, the protruding flat surface portion 12 is not limited to having a rectangular shape, unless specifically limited otherwise.

Thus, the protruding flat surface portion 12 is disposed at the position where the charged terminal device 2 is to be placed (in other words, at the position where the power transfer coil 13 is incorporated). The charged terminal device 2 is placed face to face on the protruding flat surface portion 12. Because the protruding flat surface portion 12 protrudes from the side surface 11, the peripheral edge portion of the charged terminal device 2 is detached from the side surface 11 to an appropriate degree. This allows the user's fingers to easily catch the peripheral edge portion of the charged terminal device 2 placed on the side surface 11 so that the charged terminal device 2 can be easily picked up from the side surface 11. The height of the protruding flat surface portion 12 may be determined to be an appropriate height from such a perspective. The height of the protruding flat surface portion 12 may be, for example, from about 1 mm to about 10 mm. The height of the protruding flat surface portion 12 may preferably be greater than or equal to 2 mm and preferably less than or equal to 8 mm, or more preferably less than or equal to 5 mm.

The protruding flat surface portion 12 may be in a shape having rotational symmetry, such as a shape that follows a circle, square, regular hexagon, or the like. The protruding flat surface portion 12 does not support the entirety of the charged terminal device 2 but it may have a sufficient area to support the charged terminal device 2. In this case, because the protruding flat surface portion 12 is in a shape having rotational symmetry, the charged terminal device 2 can be placed in any appropriate orientation on the protruding flat surface portion 12. As a result, the angle of the users wrist is not restricted when the charged terminal device 2 is placed onto the protruding flat surface portion 12, so the user's stress is alleviated when the charged terminal device 2 is placed onto the protruding flat surface portion 12. For example, the protruding flat surface portion 12 is in a substantially rectangular shape that follows a square with rounded corners in this embodiment. As a result, the charged terminal device 2 can be placed at any orientation in a proper balance.

Power Transfer Coil 13

The power transfer coil 13 may be incorporated into a raised region of the protruding flat surface portion 12. The power transfer coil 13 may be provided with a conductive wire that is wound in an annular shape along the inner surface of the protruding flat surface portion 12 so as to be contained in the raised region of the protruding flat surface portion 12. The charging pad 10 includes an electric circuit (not shown) for passing electric circuit to the power transfer coil 13. The power transfer coil 13 is controlled by the electric circuit that is incorporated in the charging pad 10. A magnetic shield may be provided between the power transfer coil 13 and the circuit board inside the charging pad 10. The magnetic shield may be composed of a metal plate, a plate made of ferrite, or the like.

Holding Mechanism 14

The charging pad 10 may include a holding mechanism 14 that allows the charged terminal device 2 to be securely held to a predetermined position of the charging pad 10. In this embodiment, the holding mechanism 14 includes a magnet 15 that is incorporated in the charging pad 10. The magnet 15 may be disposed, for example, in the protruding flat surface portion 12. Because the magnet 15 is disposed in the protruding flat surface portion 12, the charged terminal device 2 can be securely held onto the protruding flat surface portion 12. The magnet 15 may be disposed, for example, around the power transfer coil 13.

Charged Terminal Device 2

Figure 3:
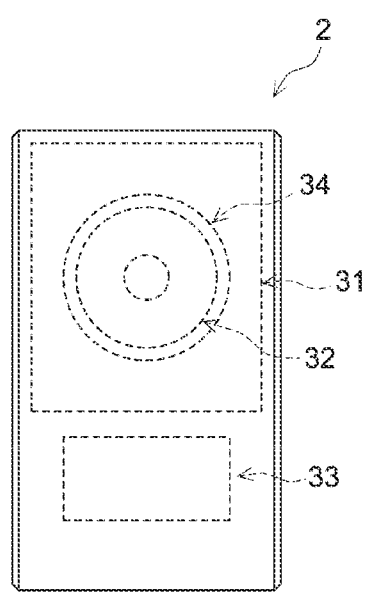
FIG. 3 is a plan view of a charged terminal device 2.

FIG. 3 is a plan view of the charged terminal device 2. The charged terminal device 2 includes, as illustrated in FIG. 3, a battery 31 that stores electric power, a non-contact charging power receiving coil 32, and a non-contact charging circuit board 33. The power receiving coil 32 includes a conductive wire that is wound in an annular shape. The circuit board 33 is a circuit for charging the battery 31 with the electromotive force generated in the power receiving coil 32.

Such a charged terminal device 2 may be a portable charger that is able to be charged by non-contact charging. In this embodiment, the battery 31 is what is called a laminate cell that is covered with a laminate film. The charging pad 10 and the charged terminal device 2 may be configured to perform charging according to a predetermined standard corresponding to the battery performance of the charged terminal device 2. For example, the charging pad 10 emits a predetermined signal from the power transfer coil 13. When the power receiving coil 32 is positioned appropriately with respect to the power transfer coil 13, the signal emitted by the power transfer coil 13 is received by the power receiving coil 32. Thus, the charging pad 10 may be configured to detect that the power receiving coil 32 is positioned appropriately with respect to the power transfer coil 13, and to start non-contact power transfer to the charged terminal device 2 through the power transfer coil 13 and the power receiving coil 32.

The charged terminal device 2 may include a terminal for power transfer to a smartphone, a tablet terminal device, or the like. The non-contact charging power receiving coil 32 and the non-contact charging circuit board 33 may be configured to be able to be used as a device for non-contact power transfer to a smartphone, a tablet terminal device, or the like. For example, the charged terminal device 33 may include a control circuit for power transfer to a smartphone, a tablet terminal device, or the like.

As an example of lithium-ion secondary battery, it is possible to use what is called an NMC three-component lithium-containing transition metal composite oxide ($LiNi_x Co_y Mn_z O_2$), which contains nickel manganese cobalt, for the positive electrode active material, graphite for the negative electrode active material, and ethylene carbonate or ethyl methyl carbonate for the electrolyte solution. The battery of the charged terminal device 2 is able to be charged at a very high current of, for example, 5C or higher.

The charged terminal device 2 is provided with a magnet 34 for positioning the charged terminal device 2 relative to the charging pad 10. The magnet 34 is disposed outward of the power receiving coil 32. In this embodiment, the magnet 34 of the charged terminal device 2 corresponds to the magnet 15 disposed in the charging pad 10. In this embodiment, the magnet 34 of the charged terminal device 2 may be disposed around the power receiving coil 32 so as to be attracted to the magnet 15 disposed around the power transfer coil 13 of the charging pad 10. With such a configuration, the position of the charged terminal device 2 is adjusted to a position such that the magnet 34 disposed around the power receiving coil 32 of the charged terminal device 2 and the magnet 15 disposed around the power transfer coil 13 of the charging pad 10 can be attracted to each other. This enables efficient power transfer between the power transfer coil 13 of the charging pad 10 and the power receiving coil 32 of the charged terminal device 2.

The power transfer coil 13 of the charging pad 10 and the power receiving coil 32 of the charged terminal device 2 are configured to be opposed to each other when the positions of the charging pad 10 and the charged terminal device 2 are adjusted by the effect of the above-described magnets 15 and 34. In this case, the magnet 34 disposed around the power receiving coil 32 of the charged terminal device 2 and the magnet 15 disposed around the power transfer coil 13 of the charging pad 10 are attracted to each other so that the charged terminal device 2 can be held at an appropriate position. This allows the user to know that the charged terminal device 2 has been placed at an appropriate position both visually and by sense of touch of the user's hand.

This charging pad 10 incorporates the magnet 15 as the holding mechanism 14. The magnet 15 is disposed, for example, in the protruding flat surface portion 12. The charging pad 10 may be mounted on a wall. When this is the case, the charging pad 10 is able to hold the charged terminal device 2 by the magnetic force of the built-in magnet 15. Thus, because the charging pad 10 includes the magnet 15 as the holding mechanism 14, the charging pad 10 has a high degree of flexibility in terms of the location to which it is mounted.

Light Emitting Unit 16

The light emitting unit 16 is disposed at the peripheral edge portion of the side surface 11. In this embodiment, the light emitting unit 16 is circumferentially continuous along the corner portions of the peripheral edge of the side surface 11 on which the charged terminal device 2 is placed face to face. As a result, even though the charged terminal device 2 is placed on the protruding flat surface portion 12 disposed in the center of the side surface 11 during charging, the light emitting unit 16 of the charging pad 10 shows good visibility. In this embodiment, the light emitting unit 16 includes an LED light and is configured to change the color of the emitted light by the control circuit incorporated in the charging pad 10.

The light emitting unit 16 may be configured to change a light emission pattern when the power transfer coil 13 is positioned in a face-to-face relationship with the non-contact charging power receiving coil 32 of the charged terminal device 2. This allows the user to visually recognize that the power transfer coil 13 is positioned appropriately in a face-to-face relationship with the non-contact charging power receiving coil 32 of the charged terminal device 2. In addition, the light emitting unit 16 may be configured to change its light emission pattern when the charging starts and when the charging ends. This allows the user to visually recognize the start of charging and the end of charging and also to identify whether the charged terminal device 2 is charged or not charged. It is also possible that a change of the light emission pattern at the start of charging and a change of the light emission pattern at the end of charging may be in different forms from each other. Thus, the change of the light emission pattern that indicates the start of charging allows the user to visually recognize the start of charging. Also, the change of the light emission pattern that indicates the end of charging allows the user to visually recognize the end of charging. Furthermore, the light emitting unit 16 may be configured to further change the light emission pattern when a predetermined time has elapsed with the charged terminal device 2 being placed on the charging pad 10 even after the changing ended. This serves to prevent the charged terminal device 2 from being left on the charging pad 10 even after the charging ended. The change of light emission pattern may include turning-off from a light-on condition, turning-on from a light-on condition, blinking from the light-off or light-on condition, a change in blinking cycle, a shift of light emitting position in the light emitting unit 16, and a change in color of the emitted light, for example. The change in color of the emitted light may include a change in color of the emitted light in a portion of the light emitting unit 16.

For example, the light emission pattern of the light emitting unit 16 may be controlled so that the light emitting unit 16 emits a green color light, indicating standby, until, although the charging pad 10 is in a chargeable condition, the power transfer coil 13 is positioned facing the non-contact charging power transfer coil 13 of the charged terminal device 2, then the light emitting unit 16 changes the color of the light to yellow when the power transfer coil 13 is positioned facing the power receiving coil 32 of the charged terminal device 2, and the light emitting unit 16 further changes the color at the start of charging as well as during charging. Thus, the light emitting unit 16 is controlled so as to emit light with predetermined light emission patterns at predetermined timings, and thereby, the user is able to visually recognize the status of the charging pad 10 through the light emission pattern of the light emitting unit 16. Although not shown in the drawings, the charging pad 10 may also include a controller for controlling light emission of the light emitting unit 16.

The charging pad 10 may be set so as to change the light emission pattern according to the charge level from the charging pad 10 to the charged terminal device 2. This allows the user to visually recognize the charge level. For example, the light emission pattern may be set so that the length of time of light emission (in other words, the cycle of light emission) or the color of light can change according to the charge level, so as to allow the user to visually recognize the charge level during charging.

In this embodiment, the light emitting unit 16 is circumferentially continuous along the peripheral edge of the side surface 11. The light emission pattern may be set so that the color of the emitted light can change at a portion of the light emitting unit 16 during charging. Alternatively, the light emission pattern may be set so that the portion of the light emitting unit 16 that emits light can move along a circumferential direction. It is also possible that the move of the portion of the light emitting unit 16 that emits light may become faster or slower as the completion of charging nears. It is also possible that the cycle of light emission of the light emitting unit 16 may become shorter or longer as the completion of charging nears.

Such a change in light emission pattern may allow the user to visually recognize the charge level or the situation where the completion of charging is nearing. Because the light emission pattern of the light emitting unit 16 is configured to change sequentially, the user is able to visually recognize the charging status. The light emitting unit 16 may include an LED light source. The light emitting unit 16 may also be provided with a semitransparent cover that transmits light so as to cover the LED light source.

In this embodiment, the light emitting unit 16 is circumferentially continuous except for a portion of the peripheral edge of the side surface 11. In such an embodiment, because of the visual effect, the user tends to slide the charged terminal device 2 onto the side surface 11 so as to face the side surface 11 more easily from an edge portion 16b where the light emitting unit 16 is not provided than from an edge portion 16a where the light emitting unit 16 is provided. In this embodiment, the side surface 11 is in a substantially rectangular shape, and the light emitting unit 16 is disposed along the peripheral edge portion except for one side of the rectangular shape. This allows the user to slide the charged terminal device 2 onto the side surface 11 more easily from the one side of the rectangular shape so as to face the side surface 11. Furthermore, in this embodiment, the peripheral edge portion of the side surface 11 includes a rounded portion having a radius. The radius of the rounded portion is greater in the edge portion 16b of the region where the light emitting unit 16 is not provided than in the edge portion 16a of the region where the light emitting unit 16 is provided. In such an embodiment, because of the visual effect, the user is allowed to slide the charged terminal device 2 more easily from an end where the light emitting 16 is not provided and where the edge portion 16b with the rounded portion with a greater radius is provided. Because the edge portion 16h has a greater radius, the charged terminal device 2 is guided to the side surface 11 more easily from a lower position. Because the charged terminal device 2 is slid onto the side surface 11 from a lower position, the charged terminal device 2 can be placed more quietly onto the protruding flat surface portion 12.

In this embodiments, the light emitting unit 16 extends along an edge that is along a height axis orthogonal to the side surface 11 at opposing ends of one side where the light emitting unit 16 is not disposed. As a result, the visibility of the light emitting unit 16 of the charging pad 10 is ensured also from the side end where the light emitting unit 16 is not provided. Therefore, even when the charging pad 10 is placed on a counter of a shop or restaurant, the user is able to check the light emission pattern of the light emitting unit 16 of the charging pad 10 from a relatively distant seat away from the counter.

As described above, the charging pad 10 disclosed herein includes the side surface 11 on which the charged terminal device 2 is to be placed face to face. The side surface 11 includes the protruding flat surface portion 12 that is raised from the peripheral edge portion, the power transfer coil 13 that is incorporated in a raised region of the protruding flat surface portion 12, and the holding mechanism 14 that allows the charged terminal device 2 at a predetermined position with respect to the power transfer coil 13. Such a charging pad 10 allows the user to easily recognize the position at which the charged terminal device 2 is to be placed because of the visual effect, so that the charged terminal device 2 can be guided easily to an appropriate position on the protruding flat surface portion 12. Also, the holding mechanism 14 allows the charged terminal device 2 to be held smoothly to a predetermined position with respect to the power transfer coil 13. Moreover, when the user picks up the charged terminal device 2 from the charging pad 10, the user can easily take hold of the charged terminal device 2 because the charged terminal device 2 is placed on the protruding flat surface portion 12 of the side surface 11. As a result, positioning between the power transfer coil 13 of the charging pad 10 end and power receiving coil 32 on the power receiving end is easy to understand and simple even for first-time users, so that non-contact charging that is easy to use and smooth can be achieved.

The entire charging pad 10 may be covered with a transparent cover. The transparent cover may be made of an acrylic resin, or may be of a material that does not hinder non-contact charging. In this case, the cover may include a protruding part along the protruding flat surface portion 12 provided in the side surface 11. Because such a cover is provided, the charging pad 10 is prevented from becoming dirty or attaching of contaminants.

Various embodiments of the invention have been described hereinabove according to the present disclosure. Unless specifically stated otherwise, the embodiments described herein do not limit the scope of the present invention. It should be noted that various other modifications and alterations may be possible in the embodiments of the invention disclosed herein. In addition, the features, structures, or steps described herein may be omitted as appropriate, or may be combined in any suitable combinations, unless specifically stated otherwise.

The invention claimed is:

1. A charging pad comprising:
   a side surface on which a charged terminal device is to be placed face to face, the side surface comprising:
      a protruding flat surface portion raised from a peripheral edge portion of the protruding flat surface portion that is inset from a peripheral edge portion of the side surface;
      a power transfer coil incorporated in a raised region of the protruding flat surface portion; and
      a holding mechanism allowing the charged terminal device to be held to a predetermined position with respect to the power transfer coil, wherein:
         the outer peripheral edge of the side surface is substantially rectangular in shape and includes one side that is rounded with a greater radius between the side surface and an intersecting end surface of the charging pad than radii of intersection between the other three sides of the outer peripheral edge of the side surface and respective end surfaces of the charging pad, and
         the charging pad further comprises a light emitting unit disposed at the peripheral edge portion of the side surface except for along the one side that is rounded with a greater radius between the side surface and the intersecting end surface of the charging pad, wherein the light emitting unit extends part way down along each of opposing end surfaces of the charging pad at each of the opposing ends of the one side so as to be visible when the charged terminal device is placed on the protruding flat surface portion of the side surface.

2. The charging pad according to claim 1, wherein the holding mechanism comprises a built-in magnet.

3. The charging pad according to claim 2, wherein the magnet is disposed in the protruding flat surface portion.

4. The charging pad according to claim 1, wherein the light emitting unit is configured to change a light emission pattern when the power transfer coil is positioned in a face-to-face relationship with a non-contact charging coil of the charged terminal device.

5. The charging pad according to claim 1, wherein the light emitting unit is configured to change a light emission pattern when charging starts.

6. The charging pad according to claim 1, wherein the light emitting unit is configured to change a light emission pattern when charging ends.

7. The charging pad according to claim 1, wherein the side surface is in a substantially rectangular shape, and the light emitting unit is disposed along the peripheral edge portion except for one side of the rectangular shape.

8. The charging pad according to claim 7, wherein the peripheral edge portion of the side surface includes a rounded portion having a radius, and the radius is greater in a region where the light emitting unit is not disposed than in a region where the light emitting unit is disposed.

9. The charging pad according to claim 7, wherein the light emitting unit extends along an edge that is along a height axis orthogonal to the side surface at opposing ends of the one side of the rectangular shape where the light emitting unit is not disposed.

10. The charging pad according to claim 1, wherein the protruding flat surface portion has a rotationally symmetrical shape.

11. The charging pad according to claim 10, wherein the protruding flat surface portion is in a substantially square shape.

12. The charging pad according to claim 1, wherein the protruding flat surface portion is raised from the side surface by a height that is in a range from 1 mm to 10 mm.

13. The charging pad according to claim 1, wherein length and width dimensions of the protruding flat surface portion are smaller than respective length and width dimensions of the charged terminal device such that the protruding flat surface portion is configured to contact a portion of the face of the charged terminal device that is smaller than the entire face of the charged terminal device.

14. The charging pad according to claim 1, wherein the one side of the outer peripheral edge of the side surface that is rounded with a greater radius than the other three sides of the outer peripheral edge of the side surface is configured to allow the charged terminal device to be smoothly slid along the greater radius into contact with the side surface from a lower position on the intersecting end surface than when the charged terminal device is brought into contact with the side surface from any of the other respective end surfaces.

15. The charging pad according to claim 1, wherein the entire charging pad is covered with a transparent cover material.

16. The charging pad according to claim 15, wherein the transparent cover material comprises an acrylic resin.

* * * * *